Patented Nov. 5, 1946

2,410,688

UNITED STATES PATENT OFFICE 2,410,688

METHOD OF MAKING PROTECTIVE COMPOSITION AND RESULTING PRODUCT

Carl L. Shapiro, New York, N. Y., assignor to Lynnwood Laboratories, Inc., Essex County, N. J., a corporation of New Jersey No Drawing. Application January 6, 1940,
Serial No. 312,684

8 Claims. (Cl. 106—219)

The present invention is directed to coating compositions, and more particularly to a composition which is adapted for use in protecting surfaces of non-ferrous metals and making the same resistant to corrosion.

In application Serial No. 300,448, filed October 20, 1939, in which the present applicant is one of the joint applicants, there was described the treatment of surfaces, usually of metal, in order to protect the same against corrosion. As described in said application, there was provided an oil which was generally the glyceride of a higher fatty acid or a mixture of fatty acids, to which there was usually added solid material of resinous character. To such a composition there was added a small amount of an inorganic or an organic acid which caused a reaction to take place, wherein the added acid united with one or more of the constituents of the composition. A composition of this character had a very greatly improved effect in increasing the corrosion resistance of the surface coated with the above described composition. Usually, the amount of such strong acid was quite small, but the results obtained in imparting resistance to corrosion were extremely beneficial.

While the composition described in said application gave the desired results, it has been found that sometimes difficulty is encountered in that when a strong acid, such as hydrochloric, nitric or the like, is added to the oil composition, the reaction goes on to the desired point, but does not always stop. Sometimes the reaction may go on to an undesirable extent and in some of the compositions of said application, it was difficult to cause the acid reaction to go to exactly the extent desired.

The present invention seeks to overcome the difficulties encountered in the addition of acid to a coating composition of the type described in the aforesaid application, and to provide a simple and effective means whereby the necessary and optimum amounts of acid may be incorporated into the final coating composition.

In carrying the objects of the present invention into effect, I provide an organic acid of high molecular weight, such as for example, the higher fatty acids having 14, 16 and 18 carbon atoms, and including as examples thereof stearic, oleic, linoleic, dehydrated ricinoleic, and similar fatty acids. To such an acid or a mixture of such acids there is added a substantial quantity of a strong acid, that is, one which has a high degree of dissociation. Such strong acids may be of organic or inorganic nature, but usually the ordinary strong inorganic acids are used, such as hydrochloric, nitric and the like.

The amount of such strong acid, equal to say up to 20%, is added to the fatty acid and a reaction is allowed to take place. Usually, merely mixing the ingredients and allowing the same to stand at ordinary room temperatures for a number of hours will cause the desired reaction to proceed to completion. However, if desired, one may slightly warm or even heat the mixture to accelerate the reaction.

It has been found that this reaction goes to completion, that is, a point is reached where no more reaction takes place, even though there may be still present an excess of the strong acid. In such case, several layers are formed and the reaction product of the strong acid with the fatty acid may be readily isolated from the stratified materials by usual and well known methods.

The reaction product may now be used for addition to the coating compositions such as those set forth in the above-identified copending application. Upon addition of the reaction product thereto, no further reaction takes place and one may add any suitable proportion of the reaction product to the coating composition. Even if no further reaction takes place in the composition, still when the same is coated upon suitable surfaces to be protected and the composition is baked at a relatively high temperature, the corrosion resistance imparted to the material to be protected is complete and highly effective.

Compositions made in accordance with the present invention may be used for coating non-metallic as well as metallic materials, but it has been found that such compositions are eminently suitable for coating non-ferrous metals. Among such metals which have been successfully treated are the alloys of magnesium, aluminum, nickel, zinc, copper, brass and various other alloys regardless of chemical composition. It is also applicable to any of the various commercial ferrous and non-ferrous metals and alloys. It has not yet been determined what chemical reactions or physical phenomena are involved, but experiments have proven that ferrous and non-ferrous metals when coated with the compositions of the type described above show extremely high resistance to corrosion. Such resistance, as far as applicant is aware, cannot be obtained by other means.

Among the high molecular weight organic acids which may be reacted with the strong acids or may be used without such reaction, are not only those named above but various other acids such as the natural resin acids, including abietic, the mixture of fatty acids obtained by the hydrolysis of vegetable or animal oils such as perilla fatty acids, the fatty acid (9, 11 octadecadienic) obtained by the dehydration of ricinoleic acid, and various other acids of the same general nature.

Among the strong acids which may be used for applicant's purpose are not only those named above, but also such acids as orthophosphoric acid, picric acid, citric acid, hydrochloric, and various others. It is essential, of course, that the acid used be sufficiently strong so that either upon mixing with a high molecular weight fatty acid a reaction will take place between the two, or upon the application of heat the reaction will take place.

Various coating compositions may be treated with the reaction product described above. Preferably, such reaction products are incorporated with compositions of the character described in the aforesaid copending application, but various other lacquers, varnishes and other film-forming compositions may be made by the addition of said reaction products thereto. It has also been found that a coating composition may be made using two or more oils of vegetable or animal origin which are ordinarily not fully compatible with each other. In such case, the addition of the reaction product of the present invention seems to make the same more compatible and successful compositions of this character have been made.

The following are specific examples of the operation of the present invention:

Example I

A composition is made from a mixture of two parts by volume of a paracoumarone-indene resin cooked in oil an one part of boiled linseed oil and one part of asphaltum. The mixture is sprayed upon the aluminum surface to be protected until a coat of uniform thickness is obtained. Because of the viscosity of the solution, the same will adhere properly even before drying. Thereupon, the article is placed in an oven maintained at 650° F. for eight minutes, after which it is removed. The article may be allowed to cool in the air or it may be immediately quenched in water, brine or oil without adversely affecting the surface.

A comparative test was made by subjecting the article so treated with a 20% solution of sodium hydroxide at 100-110° F. for ten minutes. The weight of the article was taken both before and after the test. It showed a loss of .0012 gram per square inch. An identical article which was not treated showed under identical conditions a loss of .0319 gram per square inch.

Example II

The same mixture of resins, oils and asphaltum was made as in Example I. The identical article was coated in the same manner with this composition and baked as stated above at 650° F. for eight minutes.

A comparative test was made by subjecting the article so treated with a 50% solution of hydrochloric acid at room temperature for ten minutes. The weight of the article was taken both before and after the test. It showed a loss of .0190 gram per square inch. An identical article which was not treated showed in only a five minute test under identical conditions, a loss of .5942 gram per square inch.

Example III

Fully dehydrated ricinoleic acid is mixed with 10% by volume of commercial concentrated hydrochloric acid and the mixture is vigorously stirred. It is allowed to stand for about twenty-four hours, as the result of which the reaction product of the two acids separates from the excess of hydrochloric acid and forms a layer on top of the same. It is removed from the excess hydrochloric acid solution.

The same mixture of resins, oils and asphaltum was made as in Example I. To this mixture is added 10% by volume of the above described reaction product. An aluminum surface is coated by spraying or by brushing with the composition. Thereafter, the coated article is placed in an oven at about 650° F. for eight minutes to cause baking to take place, after which the article is removed.

The coated surface has been found to be extremely resistant to the influence of various substances which ordinarily corrode aluminum rapidly. For instance, it was subjected to a test by immersion in boiling potash for ten minutes, removed therefrom, washed and dried. As a result, there was no noticeable loss of weight. It was then subjected to the same test with hydrochloric acid as in Example II, as the result of which the loss by weight was .0039 gram per square inch.

Example IV

The same mixture of resins, oils and asphaltum was made as in Example I. To this mixture was added 10% by volume of dehydrated ricinoleic acid and an aluminum article was treated with the resulting composition exactly as set forth above, the baking taking place at the stated time and temperature. When subjected to the above hydrochloric acid test, the loss in weight was .0060 gram per square inch, compared to a loss of .019 gram per square inch where no free fatty acid was contained in the composition.

The presence of acid in the composition, that is, the pH value thereof, beneficially affects the adherence, flexibility, gloss, color retentivity, corrosion resistance, and general wearing characteristics of the resultant coat. The addition of the various organic and inorganic acids, bases and salts to a fatty acid, which is then incorporated in the coating material, creates a better control over the coating material than direct addition thereof to the coating material. Thereby the initial reaction takes place apart from the material, thus avoiding undesired thickening of said material and continued changes therein. Such additions to the fatty acids are particularly necessary where strong acids, such as hydrochloric, are introduced.

The compositions are applicable to both ferrous and non-ferrous bodies. The acids used in said compositions are not equally suitable for all metals. For example, a hydrochloric acid containing composition is especially suitable for non-ferrous metals, whereas nitric acid containing compositions are superior to the hydrochloric compositions for ferrous metals. For the various types of metals and alloys, the best compositions should be determined by suitable preliminary tests. Coated articles constitute an excellent base for surface enamels and other coatings, which adhere strongly to the treated articles.

What is claimed is:

1. A method of making a composition adapted for application as a film-forming coating material for protective purposes which comprises providing a higher unsaturated fatty acid taken from the class having 14, 16 and 18 carbon atoms, adding thereto an acid having a high degree of dissociation, the dissociation being sufficiently high so that upon mixing the same with said fatty acid a reaction takes place between said acids without the application of heat, allowing the mixture to stand at about room temperature for several hours until the reaction between the strong acid and organic acid is completed, the reaction taking place without the application of heat whereby a reaction takes place between said acids, removing the product of said reaction from residual added acid, introducing the same into an oleoresinous film-forming material, the resulting composition having greater adherence to articles to be coated and imparting to such articles greater resistance to corrosion.

2. A method of making a composition adapted for application as a film-forming coating material for protective purposes which comprises providing a higher unsaturated fatty acid taken from the class having 14, 16 and 18 carbon atoms, adding thereto an acid having a high degree of dissociation taken from the class consisting of hydrochloric, nitric, citric, picric, and phosphoric acids, allowing the mixture to stand at about room temperature for several hours until the reaction between the strong acid and organic acid is completed, the reaction taking place without the application of heat whereby a reaction takes place between said acids, removing the product of said reaction from residual added acid, introducing the same into an oleoresinous film-forming material, the resulting composition having greater adherence to articles to be coated and imparting to such articles greater resistance to corrosion.

3. A method of making a composition adapted for application as a film-forming coating material for protective purposes which comprises providing fully dehydrated ricinoleic acid, adding thereto an acid having a high degree of dissociation, the dissociation being sufficiently high so that upon mixing the same with said fatty acid a reaction takes place between said acids without the application of heat, allowing the mixture to stand at about room temperature for several hours until the reaction between the strong acid and organic acid is completed, the reaction taking place without the application of heat whereby a reaction takes place between said acids, removing the product of said reaction from residual added acid, introducing the same into an oleoresinous film-forming material, the resulting composition having greater adherence to articles to be coated and imparting to such articles greater resistance to corrosion.

4. A method of making a composition adapted for application as a film-forming coating material for protective purposes which comprises providing fully dehydrated ricinoleic acid, adding thereto an acid having a high degree of dissociation, the dissociation being sufficiently high so that upon mixing the same with said fatty acid a reaction takes place between said acids without the application of heat, allowing the mixture to stand at about room temperature for several hours until the reaction between the strong acid and organic acid is completed, the reaction taking place without the application of heat whereby a reaction takes place between said acids, removing the product of said reaction from residual added acid, introducing the same into an oleoresinous film-forming material consisting essentially of an oleoresinous varnish, the resulting composition having greater adherence to articles to be coated and imparting to such articles greater resistance to corrosion.

5. A method of making a composition adapted for application as a film-forming coating material for protective purposes which comprises providing a higher unsaturated fatty acid taken from the class having 14, 16 and 18 carbon atoms, adding thereto up to about 20% of hydrochloric acid, allowing the mixture to stand at about room temperature for several hours until the reaction between the strong acid and organic acid is completed, the reaction taking place without the application of heat whereby a reaction takes place between said acids, removing the product of said reaction from residual hydrochloric acid, introducing said product into an oleoresinous film-forming material in amount of 10% by volume, the resulting composition having greater adherence to articles to be coated and imparting to such articles greater resistance to corrosion.

6. A composition adapted for application as a film-forming material for protective purposes comprising an oleoresinous film-forming material having incorporated therein the reaction product of an acid having a degree of dissociation sufficiently high so that upon mixing the same with a higher fatty acid a reaction takes place between the two acids without the application of heat, with higher unsaturated fatty acids having 14, 16 and 18 carbon atoms obtained by mixing the fatty acid with the first-named acid and allowing the mixture to stand at about room temperature for several hours until the reaction between the first-named acid and organic acid is completed, the reaction taking place without the application of heat, said reaction product being a minor part of said composition.

7. A method of making a composition adapted for application as a film-forming coating material for protective purposes which comprises providing a higher unsaturated fatty acid having taken from the class having 14, 16 and 18 carbon atoms, adding thereto an acid having a high degree of dissociation, the dissociation being sufficiently high so that upon mixing the same with said fatty acid a reaction takes place between said acids without the application of heat, allowing the mixture to stand at about room temperature for several hours until the reaction between the added acid and organic added acid is completed, the reaction taking place without the application of heat whereby a reaction takes place between said acids, removing the product of said reaction from residual acid, introducing the same into an oleoresinous film-forming material, said reaction product being a minor part of said composition, the resulting composition having greater adherence to articles to be coated and imparting to such articles greater resistance to corrosion.

8. A composition adapted for application as a film-forming material for protective purposes comprising an oleoresinous film-forming material having incorporated therein the reaction product of an acid having a degree of dissociation sufficiently high so that upon mixing the same with a higher fatty acid a reaction takes place between the two acids without the application of heat, with higher unsaturated fatty acids having 14, 16 and 18 carbon atoms obtained by mixing the fatty acid with the added acid and allowing the mixture to stand at about room temperature for several hours until the reaction between the first-named added acid and organic first-named acid is completed, the reaction taking place without the application of heat, said added acid being sufficiently strong so that upon mixing the same with said fatty acid a reaction takes place between said acids with or without the application of heat.

CARL L. SHAPIRO.